(12) United States Patent
Wang et al.

(10) Patent No.: US 11,097,363 B2
(45) Date of Patent: Aug. 24, 2021

(54) ADJUSTABLE POSITIONING STRUCTURE FOR FEEDING SUPPORT PLATE OF CIRCULAR SAWING MACHINE

(71) Applicants: MICK & JACK MACHINERY CO., LTD., Changhua County (TW); NORTHTECH MACHINE LLC, Borden, IN (US)

(72) Inventors: Yen-Ming Wang, Changhua County (TW); Brandon Koetter, Borden, IN (US)

(73) Assignees: MICK & JACK MACHINERY CO., LTD., Changhua County (TW); NORTHTECH MACHINE LLC, Borden, IN (US)

( * ) Notice: Subject to any disclaimer, the term of this patent is extended or adjusted under 35 U.S.C. 154(b) by 0 days.

(21) Appl. No.: 16/885,693

(22) Filed: May 28, 2020

(65) Prior Publication Data
US 2021/0162522 A1  Jun. 3, 2021

(30) Foreign Application Priority Data
Nov. 29, 2019 (TW) ................ 108143766

(51) Int. Cl.
*B23D 47/04* (2006.01)
*B23D 59/00* (2006.01)

(52) U.S. Cl.
CPC ......... *B23D 47/042* (2013.01); *B23D 59/002* (2013.01)

(58) Field of Classification Search
CPC .. B23D 47/045; B23D 59/001; B23D 47/025; G01B 7/02; G01B 7/003; B27B 27/02; B27B 27/08; B27B 27/10; B23Q 3/007; Y10T 83/727; Y10T 83/858; Y10T 83/855; Y10T 83/857; Y10T 83/7697; Y10S 33/01; B10T 83/773
USPC ... 83/23, 446, 477.2, 467, 440, 438, 522.18, 83/522.21, 522.25, 522, 468, 468.2, 83/522.16, 471.3, 468.7, 467.1; 144/371, 144/135.2, 253.2, 253.5, 253.6; 33/706, 33/707, 708, 608, 810
See application file for complete search history.

(56) References Cited

U.S. PATENT DOCUMENTS 2,325,082 A * 7/1943 Tautz ................ B23Q 3/005
                                                    83/438
2,806,493 A * 9/1957 Gaskell ............ B23Q 3/005
                                                    83/438

(Continued)

*Primary Examiner* — Ghassem Alie
(74) *Attorney, Agent, or Firm* — Chun-Ming Shih; Lanway IPR Services

(57) ABSTRACT

An adjustable positioning structure for a feeding support plate of a circular sawing machine contains a magnetic element, a micro pneumatic cylinder, and a control button. The magnetic element is accommodated in a magnetic slider which is fitted with a guide column on a material feeding side of a table of the circular sawing machine and is configured to produce a change of a magnet value of the magnetic slider when the magnetic slider moves along the guide column reciprocately, such that a displacement value of the magnetic slider is calculated and is displayed by a display on the magnetic slider. The micro pneumatic cylinder is mounted on the magnetic slider and is configured to fix or release the magnetic slider relative to the guide column. The control button is arranged on the feeding support plate and is configured to control the micro pneumatic cylinder to operate.

3 Claims, 5 Drawing Sheets

(56) References Cited

U.S. PATENT DOCUMENTS

| | | | | |
|---|---|---|---|---|
| 5,092,058 | A * | 3/1992 | Luttmer | G01B 7/02 |
| | | | | 33/706 |
| 7,614,330 | B2 * | 11/2009 | Griswold | B23Q 3/007 |
| | | | | 33/706 |
| 2002/0157515 | A1 * | 10/2002 | Dick | B27B 27/10 |
| | | | | 83/438 |
| 2006/0090619 | A1 * | 5/2006 | Huang | B27B 27/02 |
| | | | | 83/438 |
| 2010/0071521 | A1 * | 3/2010 | Hadaway | B27B 27/02 |
| | | | | 83/76.1 |
| 2011/0061508 | A1 * | 3/2011 | Scherl | B27B 27/02 |
| | | | | 83/438 |
| 2014/0174273 | A1 * | 6/2014 | Frolov | B27B 27/00 |
| | | | | 83/440 |

* cited by examiner

ADJUSTABLE POSITIONING STRUCTURE FOR FEEDING SUPPORT PLATE OF CIRCULAR SAWING MACHINE

FIELD OF THE INVENTION

The present invention relates to an adjustable positioning structure for a feeding support plate of a circular sawing machine which is capable of moving the feeding support plate to a predetermined position stably and accurately.

BACKGROUND OF THE INVENTION

A conventional circular sawing machine is applied to cut a workpiece and contains a feeding support plate fixed on a side of a table of the circular sawing machine so as to feed and cut the workpiece stably and exactly according to using requirements.

Referring to FIG. 1, the conventional circular sawing machine contains a guide column parallelly arranged on a material feeding side of the table 10 of the circular sawing machine, a marking ruler 12 arranged on a top of the guide column 11, a slider 13 fitted on the guide column 11, and a hand wheel 14 located beside the slider 13 and configured to rotatably control a displacement of the slider on the guide column 11 horizontally, such that the feeding support plate 15 on a top of the slider 12 is actuated to move, and a displacement value of the slider 12 is distinguished by ways of the marking ruler 12. After moving the feeding support plate 15 to a predetermined position, the slider 13 is fixed on the guide column 11 by a fixing lever 16 on a side of the slider 13, thus fixing the feeding support plate.

When desiring to moving the feeding support plate, the fixing lever is released, the hand wheel is rotated to drive the slider to move on the guide column, and the slider drives the feeding support plate to move toward the predetermined position. Thereafter, the fixing lever is fixed so as to position the slider with respect to the guide column, thus fixing the feeding plate troublesomely. Moreover, it is difficult to distinguish letters on the marking ruler, thus causing distinguishing error.

The present invention has arisen to mitigate and/or obviate the afore-described disadvantages.

SUMMARY OF THE INVENTION

The primary aspect of the present invention is to provide an adjustable positioning structure for a feeding support plate of a circular sawing machine which contains a magnetic slider fitted on a guide column and configured to movably move and fix the feeding support plate, a micro pneumatic cylinder mounted on a bottom of the magnetic slider and configured to fix the magnetic slider, and a control button arranged on the feeding support plate and configured to control the micro pneumatic cylinder to actuate the magnetic slider to release or fix with respect to the guide column, such that a change of a magnet value of the magnetic slider is calculated and is displayed by a display on a side of the magnetic slider so that a user learns a displacement value of the feeding support plate based on the displacement value of the magnetic slider to determine whether the feeding support plate is moved toward the predetermined position.

Another aspect of the present invention is to provide an adjustable positioning structure for a feeding support plate of a circular sawing machine by which the control button is pressed to release the magnetic slider to move, and a change of a displacement value of the magnetic slider is calculated and is displayed by the display so as to move the feeding support plate to the predetermined position, thus adjusting the feeding support plate toward the predetermined position easily and exactly.

DETAILED DESCRIPTION OF THE PREFERRED EMBODIMENTS

Figure 1:
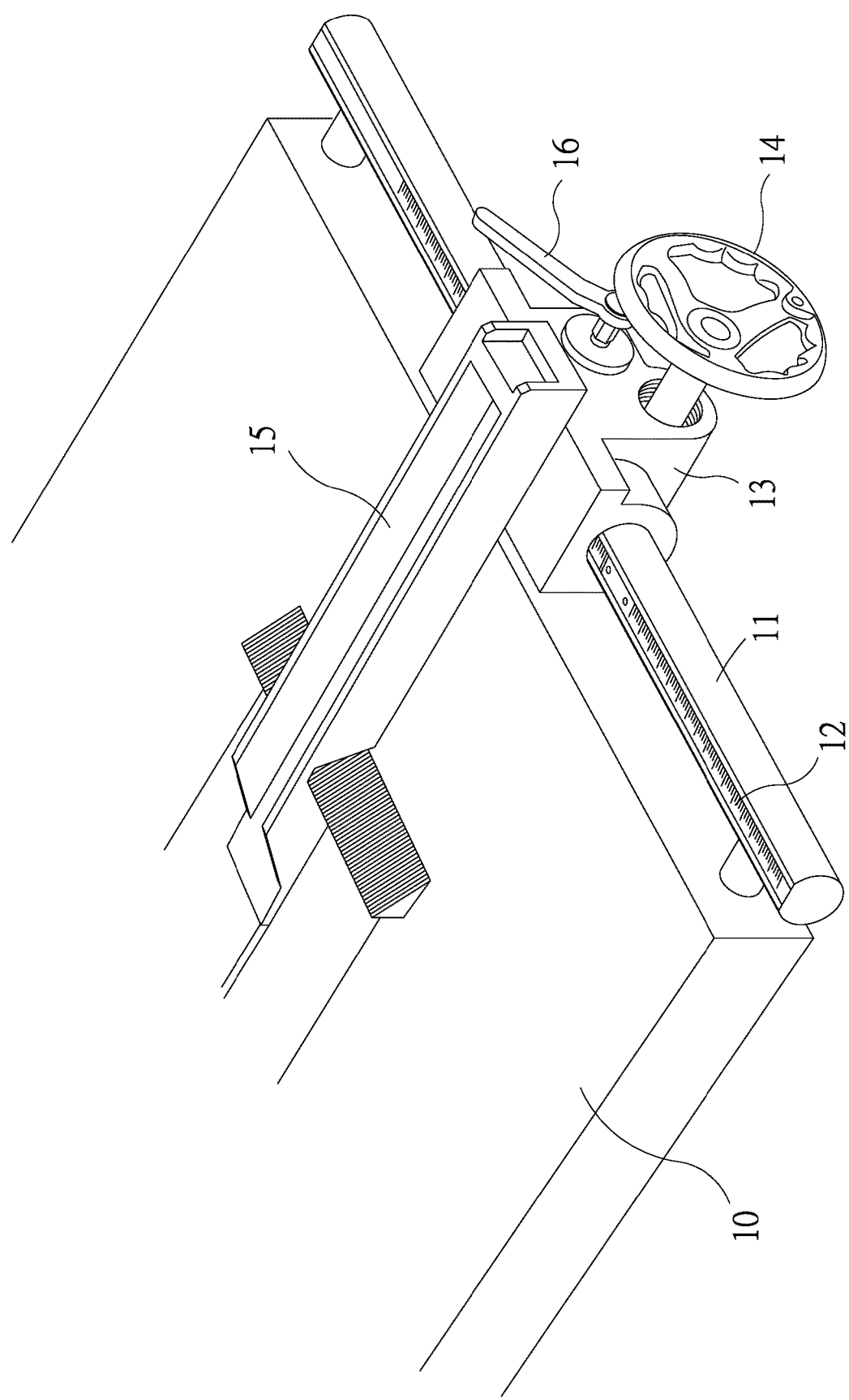
FIG. 1 is a perspective view of a conventional adjustable positioning structure for a feeding support plate of a circular sawing machine.
Figure 2:
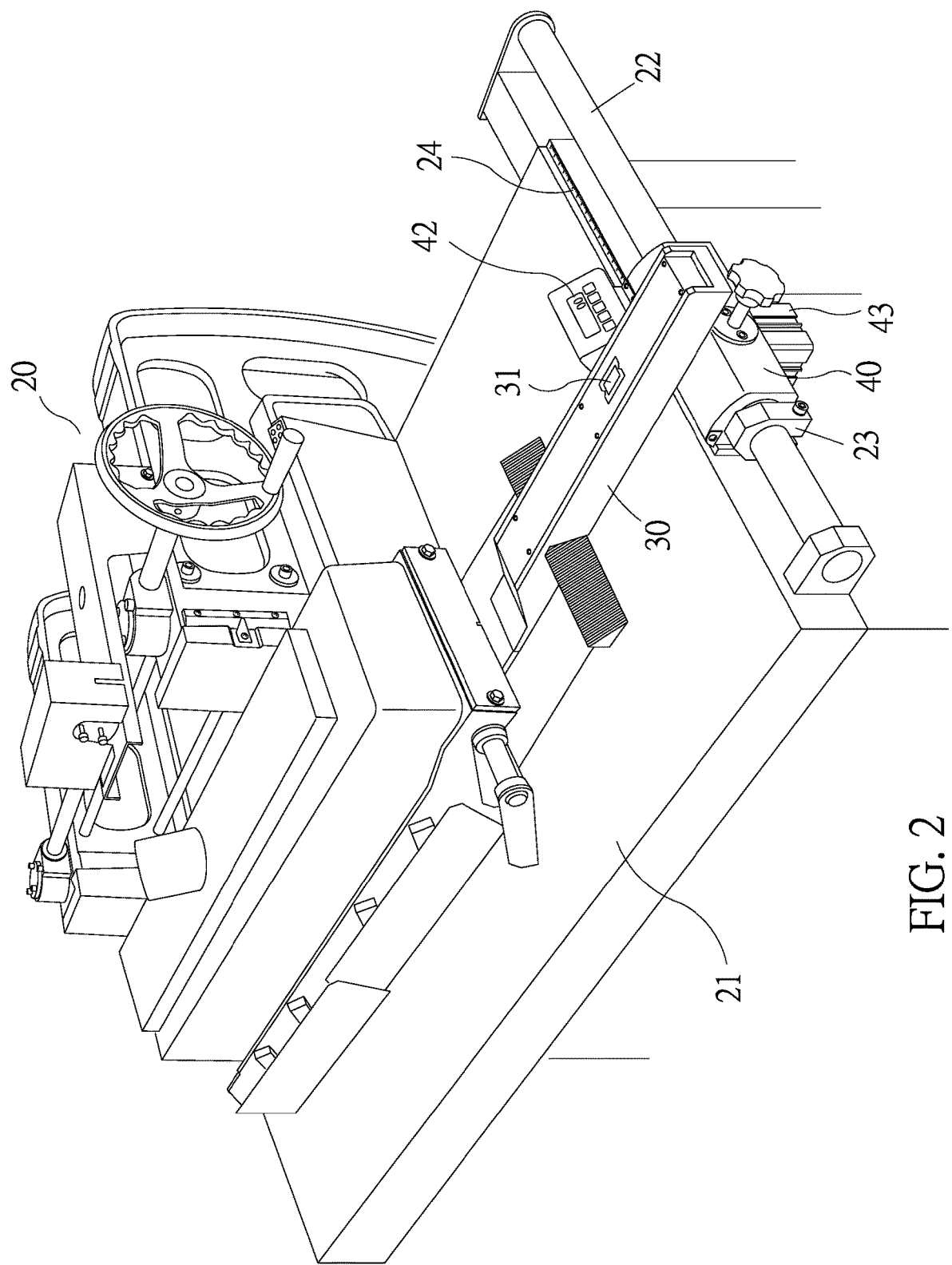
FIG. 2 is a perspective view showing the assembly of a circular sawing machine according to a preferred embodiment of the present invention.
Figure 3:
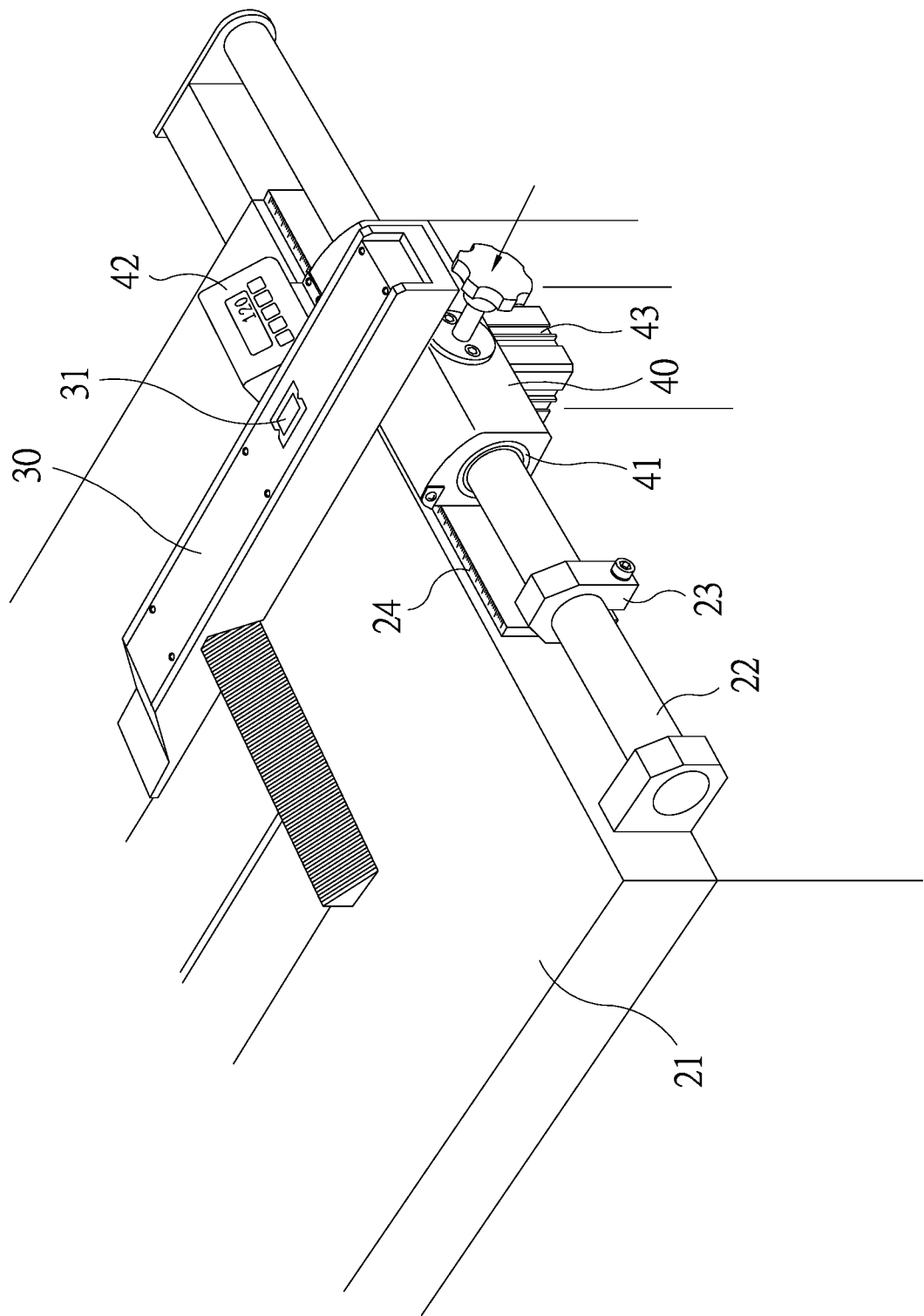
FIG. 3 is a perspective view showing the assembly of an adjustable positioning structure for a feeding support plate of the circular sawing machine according to the preferred embodiment of the present invention.
Figure 4:
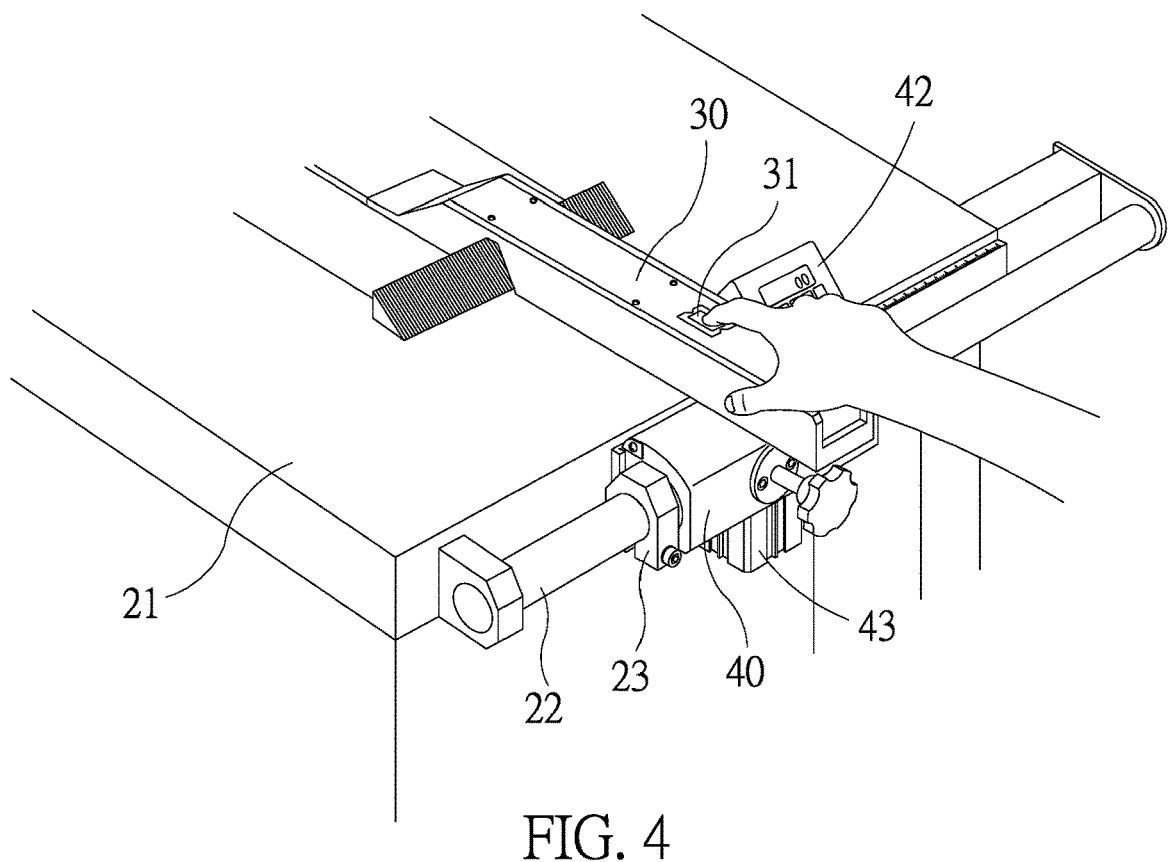
FIG. 4 is a perspective view showing the operation of the adjustable positioning structure for the feeding support plate of the circular sawing machine according to the preferred embodiment of the present invention.
Figure 5:
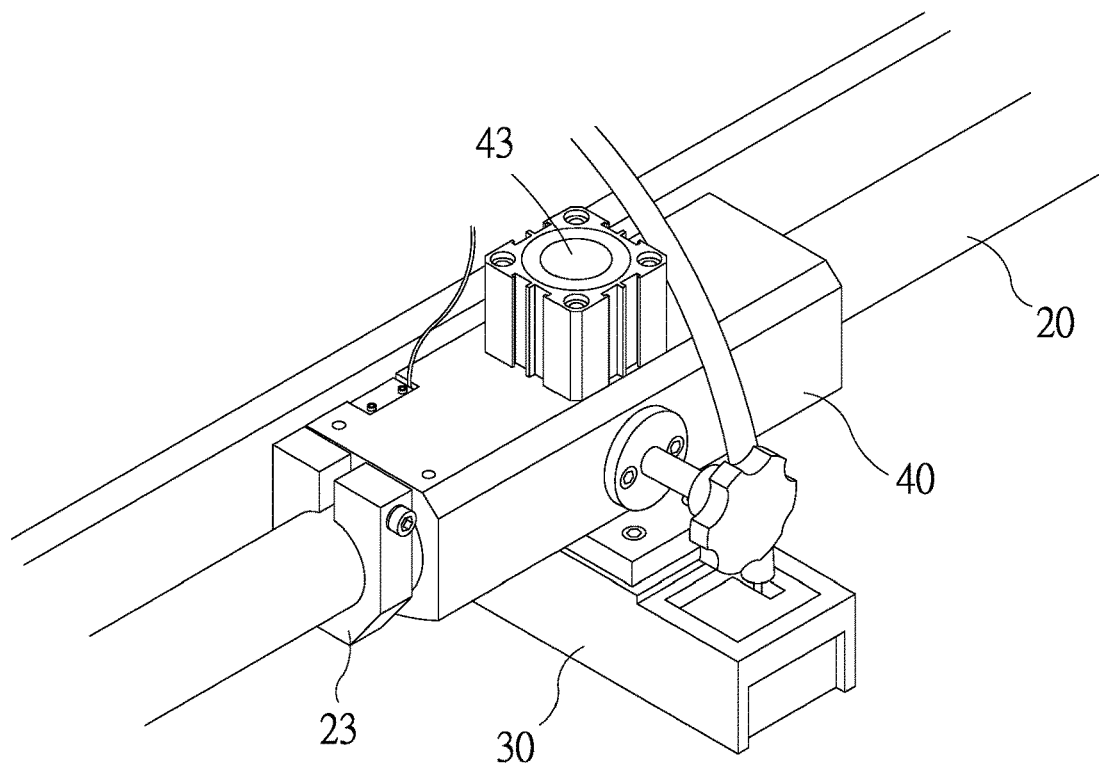
FIG. 5 is a perspective view showing the operation of a part of the adjustable positioning structure for the feeding support plate of the circular sawing machine according to the preferred embodiment of the present invention.
Figure 6:
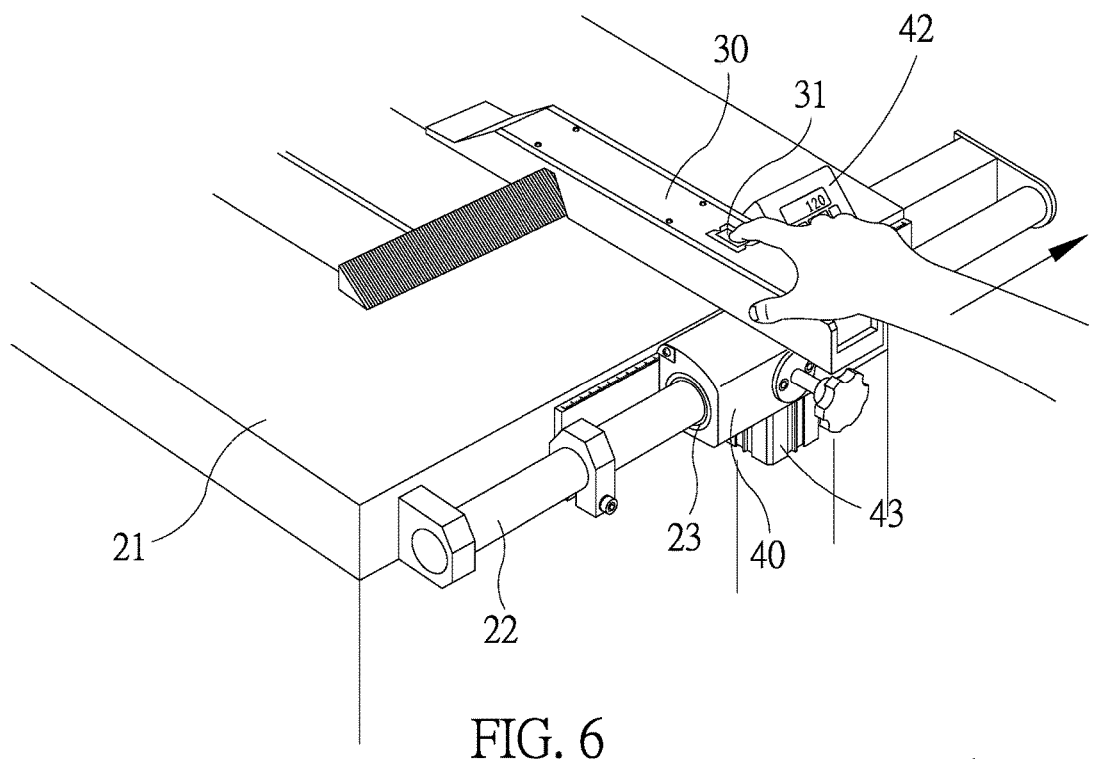
FIG. 6 is another perspective view showing the operation of the adjustable positioning structure for the feeding support plate of the circular sawing machine according to the preferred embodiment of the present invention.
Figure 7:
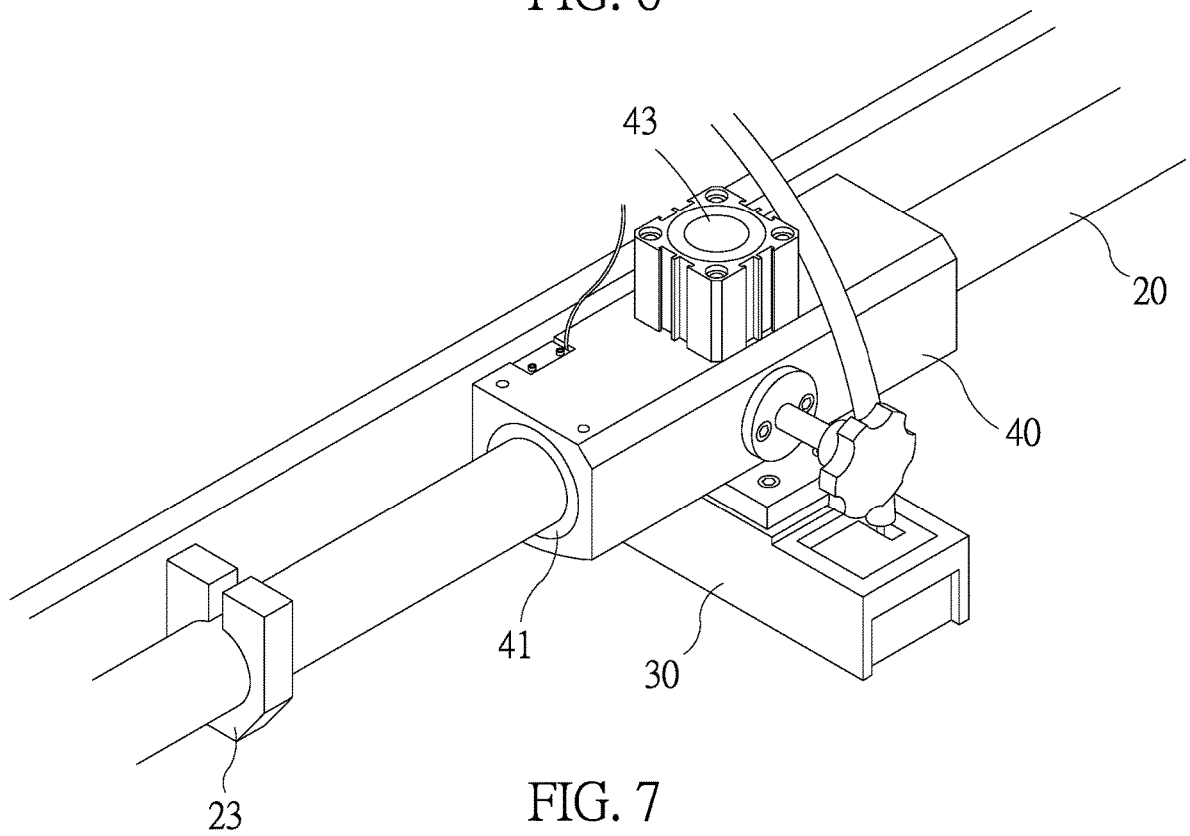
FIG. 7 is another perspective view showing the operation of a part of the adjustable positioning structure for the feeding support plate of the circular sawing machine according to the preferred embodiment of the present invention.

With reference to FIGS. 2-7, a feeding support plate 30 of a circular sawing machine 30 according to a preferred embodiment of the present invention is configured to feed workpiece and includes an end mounted on a top of a magnetic slider 40, the magnetic slider 40 is fitted with a guide column 22 parallelly arranged on a material feeding side of a table 21 of the circular sawing machine 20 so as to be reciprocately moved along the guide column 22 and to drive the feeding support plate 30 to move toward a predetermined position.

The adjustable positioning structure for the feeding support plate 30 of a circular sawing machine 20 comprises: a magnetic element 41 accommodated therein and configured to produce a change of a magnet value of the magnetic slider 40 when the magnetic slider 40 moves along the guide column 22 reciprocately, such that a displacement value of the magnetic slider 40 is calculated and is displayed by a display 42 on a side of the magnetic slider 40; an calibration seat 23 fitted on the guide column 22 and located beside the other side of the magnetic slider 40 so as to reset the magnetic slider 40 to a zero; a marking sheet 24 fixed on the material feeding side of the table 21 of the circular sawing machine 20 so that a user distinguishes a movement of the magnetic slider 40; a micro pneumatic cylinder 43 mounted on a bottom of the magnetic slider 40 and configured to fix or release the magnetic slider 40 with respect to the guide column 22; and a control button 31 arranged on a top of the feeding support plate 30 and configured to control the micro pneumatic cylinder 43 to operate.

As desiring to adjust the feeding support plate 30 toward the predetermined position based on using requirements, the control button 31 is pressed to drive the micro pneumatic cylinder 43 to release the magnetic slider 40, and the feeding support plate 30 is manually moved to actuate the magnetic slider 40 to adjustably move on the guide column 22, such that the change of the magnet value of the magnetic slider 40 is calculated and is displayed by the display 42 so that the user learns a displacement value of the feeding support plate 30 based on the displacement value of the magnetic slider 40 to determine whether the feeding support plate 30 is moved toward the predetermined position. After fixing the feeding support plate 30, the control button 31 is released to actuate the micro pneumatic cylinder 43 to move the magnetic slider 40 to an original position with respect to the guide column 22. Preferably, the magnetic slider 40 is manually moved to abut against the calibration seat 23, thus resetting the magnetic slider 40 to the zero and adjusting the feeding support plate 30 easily and accurately.

Accordingly, the control button is pressed to drive the micro pneumatic cylinder to move the magnetic slider, and the feeding support plate is manually moved to actuate the magnetic slider to adjustably move on the guide column, such that the change of the magnet value of the magnetic slider is calculated and is displayed by the display, thus adjusting the feeding support plate toward the predetermined position easily and exactly.

In other words, it is easy to adjust the feeding support plate toward the predetermined position based on the using requirement by pressing the control button on the top of the feeding support plate, thus enhancing sawing operation.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable positioning structure for a feeding support plate of a circular sawing machine, the feeding support plate being arranged on a top of a table of the circular sawing machine and configured to feed a workpiece, an end of the feeding support plate being mounted on a top of a magnetic slider, the magnetic slider being fitted with a guide column parallelly arranged on a material feeding side of the table of the circular sawing machine so as to be reciprocately moved along the guide column and to drive the feeding support plate to move toward a predetermined position;

wherein the adjustable positioning structure comprises: a magnetic element accommodated in the magnetic slider and configured to produce a change of a magnet value of the magnetic slider when the magnetic slider moves along the guide column reciprocately, such that a displacement value of the magnetic slider is calculated and is displayed by a display on a side of the magnetic slider; a micro pneumatic cylinder mounted on a bottom of the magnetic slider and configured to fix or release the magnetic slider with respect to the guide column; and a control button arranged on a top of the feeding support plate and configured to control the micro pneumatic cylinder to operate.

2. The adjustable positioning structure as claimed in claim 1, wherein a calibration seat is fitted on the guide column, located beside another side of the magnetic slide, and configured to reset the magnetic slider to a zero.

3. The adjustable positioning structure as claimed in claim 1, wherein a marking sheet is fixed on the material feeding side of the table of the circular sawing machine so that a user distinguishes a movement of the magnetic slider.

\* \* \* \* \*